United States Patent [19]
Wroblewski et al.

[11] Patent Number: 4,736,367
[45] Date of Patent: Apr. 5, 1988

[54] SMART CONTROL AND SENSOR DEVICES SINGLE WIRE BUS MULTIPLEX SYSTEM

[75] Inventors: Thomas R. Wroblewski, Sterling Heights; Frederick O. R. Miesterfeld, Troy, both of Mich.

[73] Assignee: Chrysler Motors Corporation, Highland Park, Mich.

[21] Appl. No.: 944,714

[22] Filed: Dec. 22, 1986

[51] Int. Cl.⁴ .............................................. H01J 3/00
[52] U.S. Cl. ......................................... 370/85; 370/96; 340/825.08; 340/52 F
[58] Field of Search .................... 370/85, 89, 90, 95, 370/96; 340/825.5, 825.05, 825.06, 825.08, 52 F

[56] References Cited

U.S. PATENT DOCUMENTS

| | | | |
|---|---|---|---|
| 4,293,942 | 10/1981 | Brittain | 370/85 |
| 4,355,385 | 10/1982 | Hampshire et al. | 370/85 |
| 4,390,561 | 1/1983 | Briggs | 370/85 |
| 4,584,487 | 4/1986 | Hesse et al. | 370/85 |

*Primary Examiner*—Douglas W. Olms
*Assistant Examiner*—Frank M. Scutch, III
*Attorney, Agent, or Firm*—Wendell K. Fredericks

[57] ABSTRACT

Control of a plurality of relay drivers by smart control devices and the continuous status monitoring of a plurality of switches and associated smart sensors, wherein each smart control device and each smart sensor is connected at a separate single point on a single-wire bus, are affected by a smart control and sensor device multiplex system. The system employs a microcomputer and a driver and receiver circuit for developing a particular offset square wave pulse train which is placed on the bus to provide power and control voltage signals to the plurality of smart control devices and smart sensors. The smart control devices contain circuits that respond to the wave form in a manner that causes each smart control device to drive an associated relay driver after a chosen number of polling cycles. Current signals are sent over the bus back to the driver and receiver indicative of the status of the smart control device. The smart sensors contain cirucits that respond to the waveform in a manner that causes each smart sensor to send current signals back over the single wire bus to the driver and receiver circuit and then on to the microcomputer during designated repetitive and sequential time slots. The driver and receiver circuit receives, interprets and converts the current signals from the smart control devices and the smart sensor into voltage signals used by the microcomputer for establishing a history of the status of the bus, the control devices, the sensors and the switches. The microcomputer supplies continuous and updated information to a display system indicative of the status of each control device and each sensor and its assoiacted switch.

13 Claims, 7 Drawing Sheets

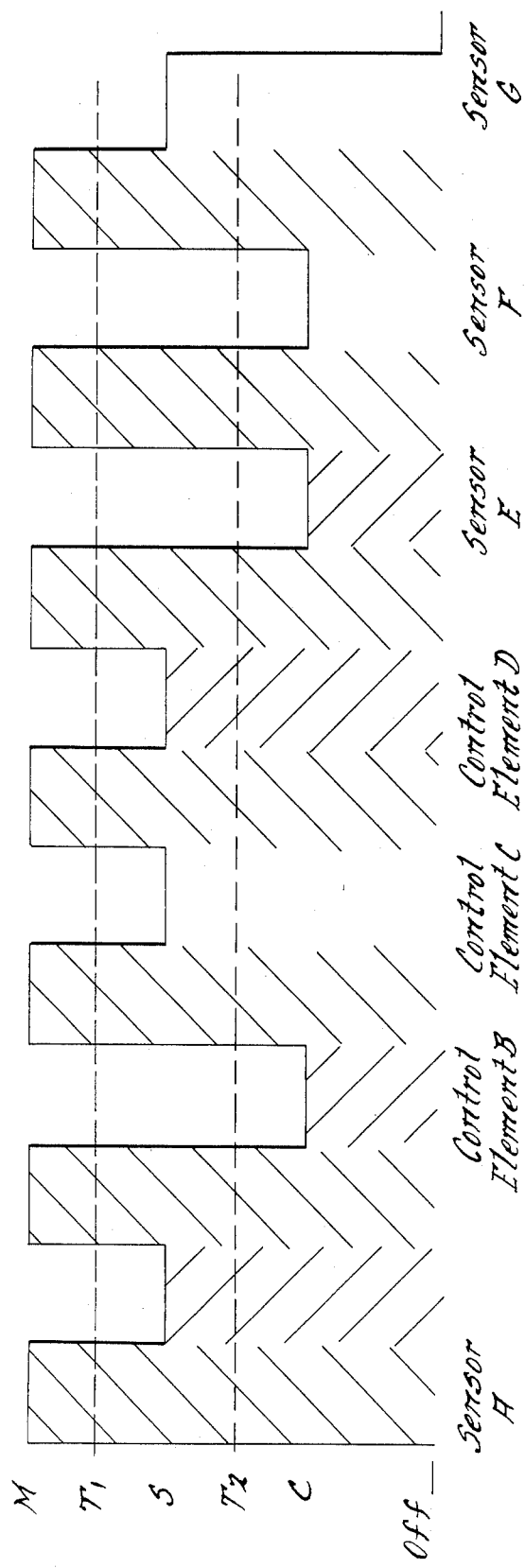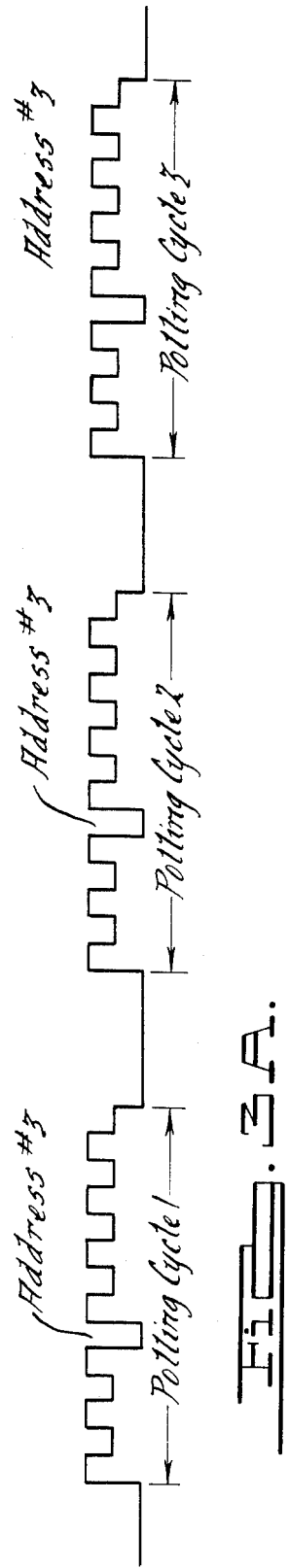
FIG. 2.
FIG. 3A.

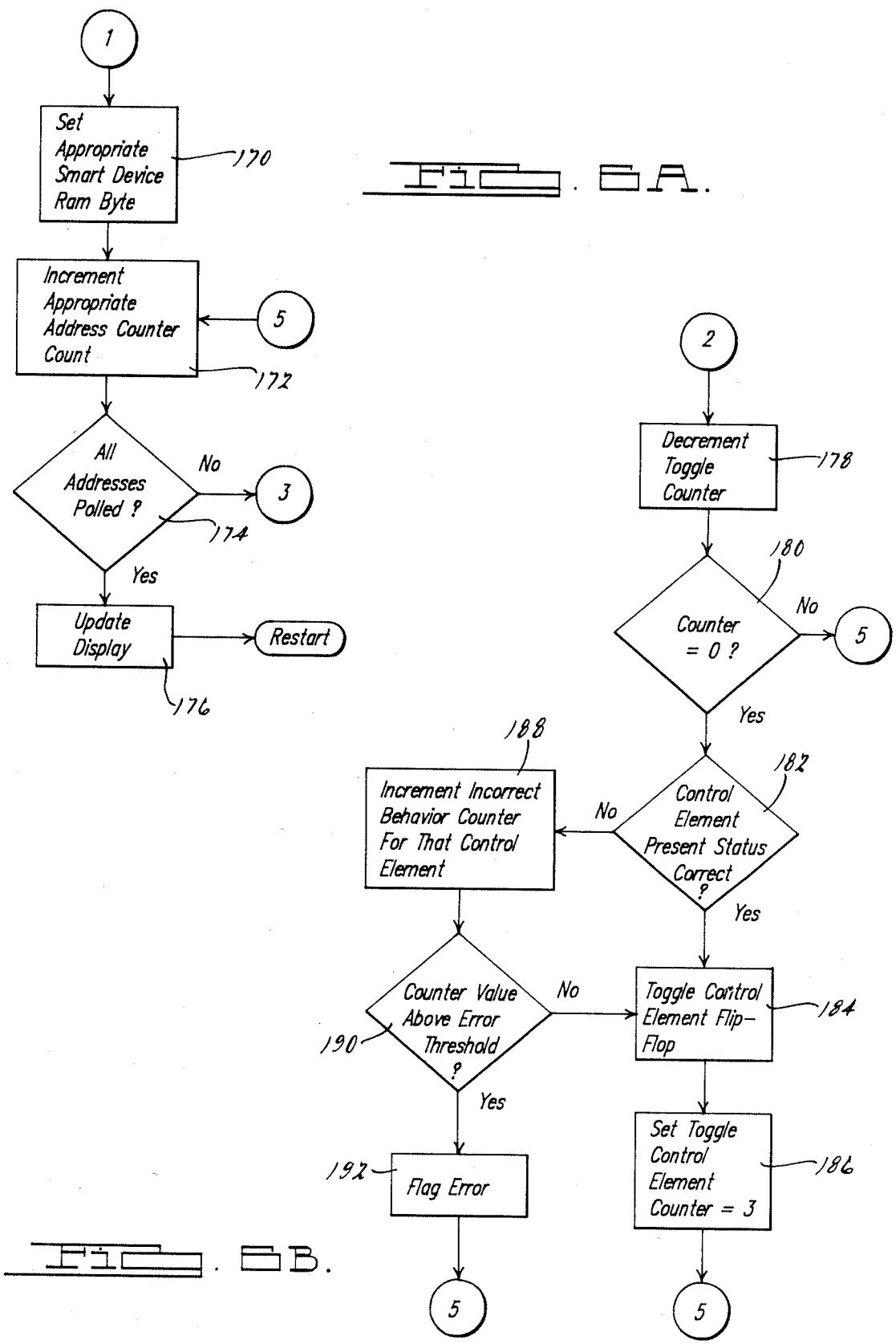

SMART CONTROL AND SENSOR DEVICES SINGLE WIRE BUS MULTIPLEX SYSTEM

BACKGROUND OF THE INVENTION

1. Field of the Invention

This invention relates to multiplexing techniques for controlling operation and obtaining status of a plurality of switching devices disposed along and connected to a single wire bus and, more particularly, in a preferred embodiment to systems for controlling the operations of relay drivers and, in addition, for obtaining status of a series of smart sensors individually connected to a series of indicating, transducing and switching type devices disposed throughout a motor vehicle. The switch status monitoring feature of this invention is similar to the one described in U.S. Pat. No. 4,677,308 by Thomas R. Wroblewski and Frederick O. R. Miesterfeld entitled "Switch Status Monitoring System, Single Wire Bus, Smart Sensor Arrangement Therefor."

2. Description of the Prior Art

A vehicle multiplex system employing a single conductor bus for control signals is described in U.S. Pat. No. 4,370,561 which issued to G. R. Briggs on Jan. 25, 1983. There, a tri-state timing waveform is generated by a multiplex timing unit. A plurality of transmitters and receivers are connected to the single conductor bus. Each transmitter is paired with a corresponding receiver. When it is desired to transmit a control signal to a receiver, a physical command must be applied to the transmitter. The receiver receives the transmitted signal and responds by connecting electrical power from a separate power conductor to a power-operated unit during a specified time in a channel interval assigned to the particular receiver.

Such a system provides control over power-operated units from remote locations, but such a system doesn't provide status information regarding the operation of the transmitters, receivers or of the power operated units.

Another single conductor multiplex system is described in U.S. Pat. No. 4,463,341 which issued July 31, 1984 to S. Iwasaki. There, a single conductor bus is utilized for both power and control function transmission. A plurality of transmitters connected to the bus receive power from the bus and supply control signals to the bus as required. A plurality of receivers also connected to the bus also receive power and control signals from the bus. Each receiver is tuned to respond only to the particular control signal produced by a single transmitter. Upon receipt of the appropriate control signals, the receivers couple power from the bus to various loads. This system requires each transmitter to transmit a unique control signal over the bus that is sensed by a designated receiver. Again control signals are used strictly for controlling circuits in a receiver, the receiver containing circuit means for apply power to a load device. No provisions are provided to monitor the status of the transmitter, receivers or the load devices.

SUMMARY OF THE INVENTION

The present invention is directed to a novel multiplex system for use with smart control elements and smart sensors. The smart control elements are used to control devices such as motors and relays, at a remote location; the smart sensors are used to monitor the operation of switches at remote locations; i.e. whether the switch is open of closed. Also this system provides diagnostic information concerning the smart control elements and smart sensors.

The system comprises a display system which provides a visual display of the status of the devices being controlled by the smart control elements and monitored by the smart sensors; a computer controlled driver and receiver circuit, a single wire bus, and smart control elements and sensors.

BRIEF DESCRIPTION OF THE DRAWING

FIG. 2 is a waveform diagram of the unique offset voltage square waveform used in this invention;

FIG. 3A is a waveform diagram depicting three polling cycles;

DETAILED DESCRIPTION OF A PREFERRED EMBODIMENT

Figure 1:
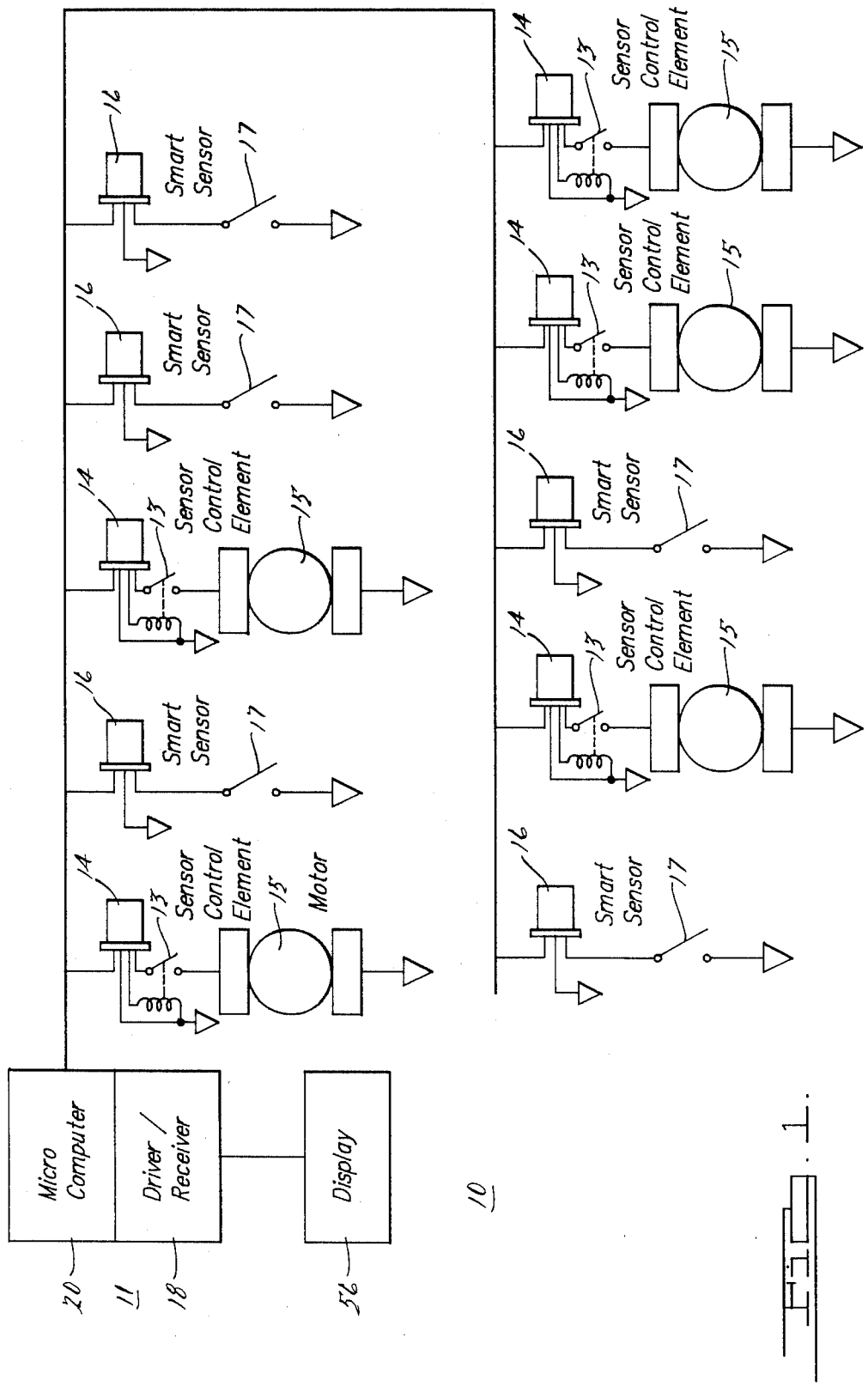
FIG. 1 is an overall block diagram illustrating the smart control element smart sensor multiplex system.

Referring now to FIGS. 1–5, wherein FIG. 1 is an overall block diagram illustrative of the smart control element and smart sensor multiplex system 10. A computer controlled driver and receiver CCD/R 11 sends voltage signals in the form of a unique offset voltage waveform shown in FIG. 2 over bus 12 to a plurality of control elements 14—14 and smart sensors 16—16. The control elements are used to control devices such as motor 15—15 while the smart sensors are used to monitor device such as switches 17—17. The control elements and smart sensors are repetitively sequentially multiplexed on to the bus to receive controlling voltage signals from CCD/R 11 and to send current signals back to CCD/R 11. The current signals are converted into voltage signals which are read by the computer. The computer then sends signals to display system 56 which displays updated status information regarding the switch motors as well as the smart sensors and smart control elements.

Figure 3:
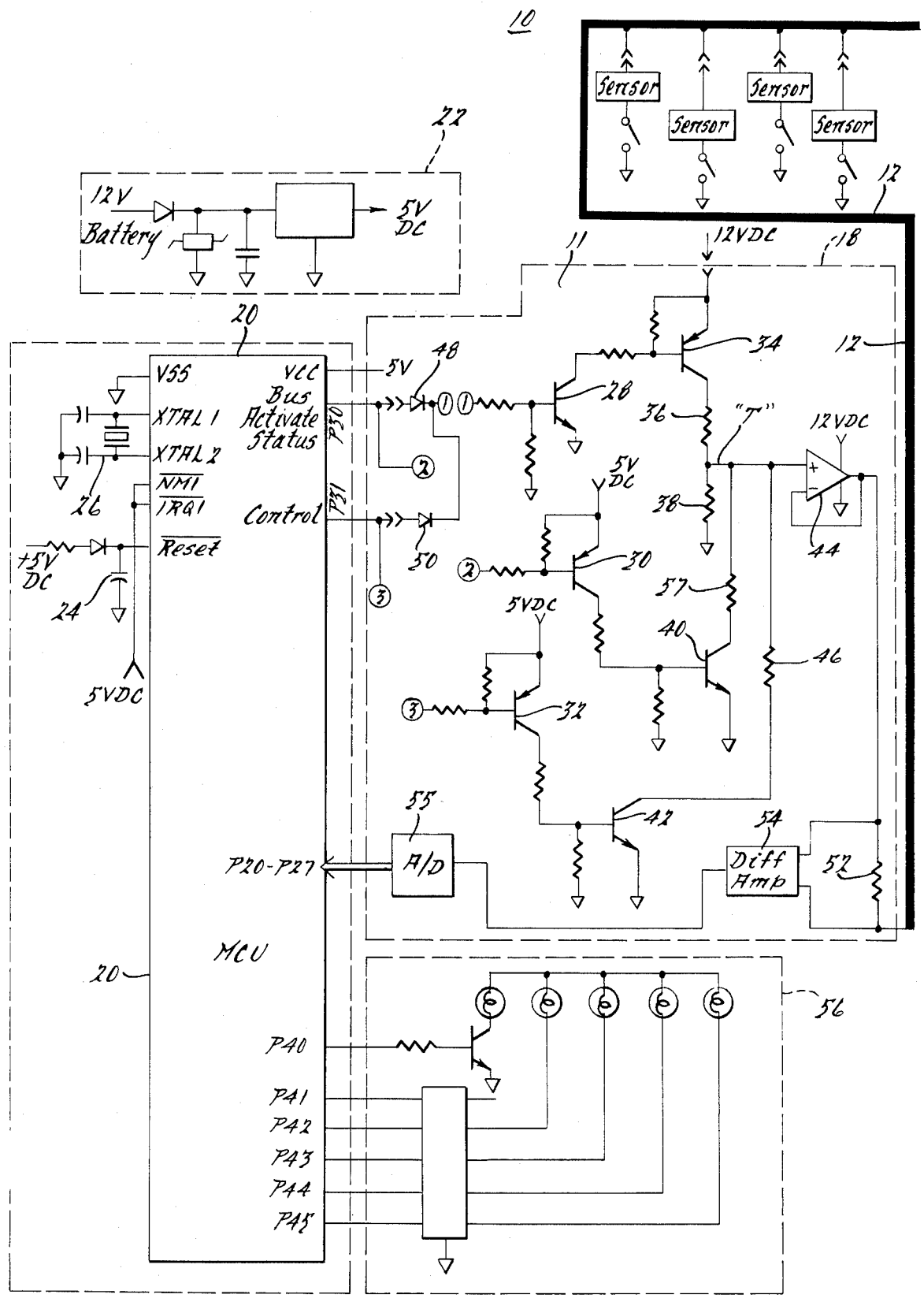
FIG. 3 is a schematic diagram of a computer controlled driver and receiver circuit of this invention and its connection to a single wire bus.

COMPUTER CONTROLLED DRIVER AND RECEIVER UNIT (see FIG. 3)

The computer controlled driver and receiver unit CC D/R 11 comprised of a microcomputer (MCU) 20 and a driver/receiver (D/R) circuit 18 is used to develop an offset square wave pulse train waveform 58 depicted in FIG. 2. Both the D/R and MCU are located, illustratively, in an instrument compartment (not shown of the vehicle). Voltage from the 12 VDC battery system is applied to D/R 18, a 5-volt regulator circuit 22 within CC D/R 11 to establish a precise output voltage (e.g. 5 VDC±2.596%). This regulated 5 VDC is applied to MCU 20 and other circuits within D/R 18 requiring 5 VDC. Regulator 22 also provides, after an externally programmed delay, a 5 VDC signal for resetting MCU 20 during a power-on phase. The 5 VDC signal which is applied to a RESET terminal of MCU 20 is a delayed signal allowing D/R 18 to become fully operable prior to being subjected to MCU control. Capacitor 24 provides the external programmed delay function, holding the output voltage of regulator 22 LOW for a fraction of time (e.g., 20 MS) delaying start-up of MCU 20. After the delay, RESET goes HIGH and MCU 20 starts executing the main software program stored in ROM of MCU 20.

MCU 20 illustratively, is a single chip 8-bit unit such as a Motorola ML 68701 microcomputer chip containing a CPU, on-chip clock, ROM, RAM, I/O lines and a timer. The on-chip clock is controlled by an external oscillator 26 while port 3 provides input/output lines P30-31.

When system 10 is turned ON, after initialization of registers and memories in MCU 20 and in accordance with the main program, P30 and P31 of MCU 20 are programmed HIGH. The "1" and "3" inputs of the transistor circuits of D/R 18 receive the HIGH signals. NPN transistor 28 is suitably biased to turn ON while PNP transistor 32 is cut off; the associated circuits of transistor 32 are not employed at this time. Thus, NPN transistor 34, being biased to turn ON, provides collector voltage to a voltage divider network, formed from a pair of resistors 36 and 38, connected between the collector of transistor 34 and ground. About two-thirds of the collector voltage is divided out at terminal "T" and becomes available at a non-inverting input of a voltage follower circuit 44. This action activates bus 12; and with respect to the waveform of FIG. 2, this action forms the leading edge of the first positive half cycle (P) of the portion of the waveform used to poll smart device A. The leading edge of output waveform from voltage follower circuit 44 which is placed on bus 12 goes from 0 VDC to 9 VDC or to level M.

To cause the negative (N) half cycle of the waveform to drop to 7 VDC, P30 of MCU 20 of FIG. 3 is programmed HIGH and P31 is programmed LOW. The "1" and "2" inputs of the transistor circuits receive the HIGH while the "3" input receives the LOW. Since PNP transistor 30 is biased to be cut-off, its associated circuits have no effect on the voltage at terminal "T". The "1" and "3" input circuits affect the voltage at terminal "T".

The "1" input circuits provide, as before, 9 VDC at terminal "T". But, however, with transistor 32 turned ON and NPN transistor 42 biased ON, resistor 46 is placed in parallel with resistor 38 between terminal "T" and ground causing the voltage at terminal "T", illustratively, to further divide down to about 7 VDC. Thus, the leading edge of the negative half cycle of the voltage for smart device "A" in FIG. 2 goes from 9 VDC to 7 VDC or level "S."

The voltage on the leading edge of the next (P) half cycle; i.e., the cycle for smart device "B" goes from 7 VDC to 9 VDC and is caused by programming a "HIGH" signal at P30 and P31 of FIG. 3. The "1" input circuit operates, as mentioned supra, to produce the 9 VDC voltage level.

To obtain the voltage change from 9 VDC to, illustratively, 5 VDC for the "N" half cycle for smart device "B" of the waveform in FIG. 2, P30 of MCU 20 of FIG. 3 is programmed LOW while P31 is programmed HIGH. The "1" input circuits are now activated by the HIGH signal from P31 and the diode reaction of blocking diodes 48 and 50. While the PNP transistor 30 is turned ON by the LOW signal at the "2" input, the NPN transistor 40 is also turned ON to place resistor 52 in parallel with resistor 38, illustratively, to divide the 9 VDC down to 5 VDC at terminal "T" or to level C. Hence, by the use of the circuits associated with the three inputs, namely "1", "2" and "3", the MCU 20 can place voltage signals on bus 12 which provide power as well as voltage signals to the smart control elements and the smart switch sensors connected to bus 12.

The output of voltage follower 44 is connected to bus 12 via a resistor 52. Resistor 52 also is coupled to a differential amplifier 54 as a current to voltage converter of current signals caused by loads placed on bus 12. The converted current to voltage signals provide information concerning control element and sensor status as well as abnormally high bus current indications back to MCU 20 via an A/D converter 55. The output of converter 55, an 8 bit word signal, is applied to P20-P27 of MCU 20.

SINGLE WIRE BUS

As mentioned supra, bus 12 is a bi-directional single wire communication assembly which transmits signal and power between D/R 18 and the smart devices 14 and 16. Illustratively, this single wire may be a flexible length of wire of a suitable gauge covered with an insulated material at all points except for smart device interface regions. Bus 12 should be reasonably flexible in order to be routed in the vicinity of all the switches, relay, motor etc., to be monitored or controlled.

SMART CONTROL ELEMENT

Figure 4:
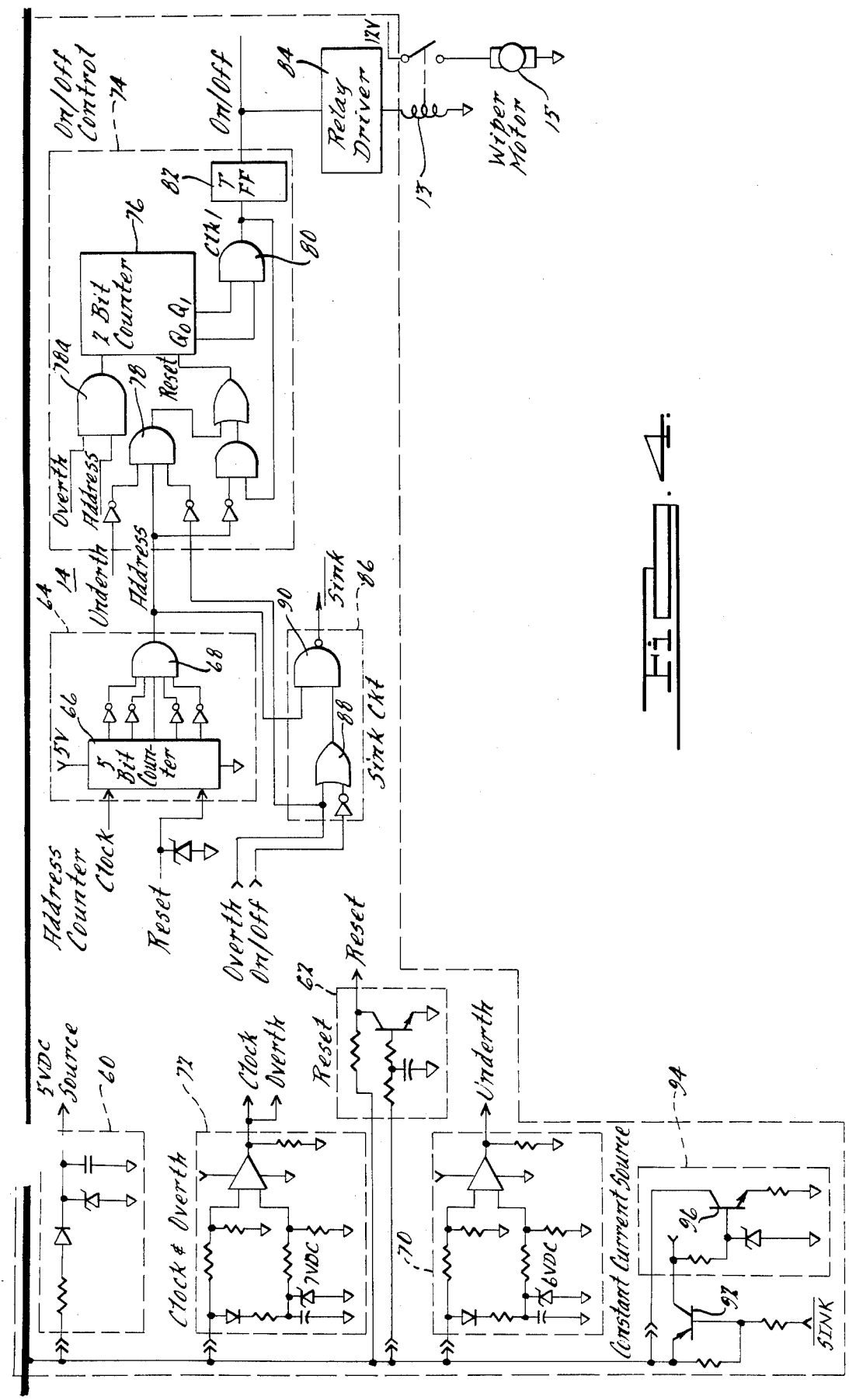
FIG. 4 is a schematic diagram of a smart control element connected to the single wire bus of FIG. 1.

A separate smart control element 14 of FIG. 4 is interposed between bus 12 and, illustratively, a motor 15 and its relay drive circuit 84. To provide power to control element 14, the offset voltage waveform 58 of FIG. 2 is driven onto bus 12. Illustratively, the transition of the leading edge of the positive (P) half cycle of the initial cycle of the waveform from 0-volt to level C of e.g. 5 VDC causes power to be supplied to the smart device but not enough to generate source voltages for the control element circuits. The control element is considered OFF.

When the leading edge of the initial (P) half cycle of the waveform goes above 5 VDC to level T2 of 6 VDC, a 5 VDC source 60 is activated and it provides 5 VDC power to all of the circuits of the control element. A reset signal generator 62 provides a reset signal to a 5-bit counter 66 of address unit 64 which resets all of the counter output to LOW or to a binary code number representation of the number zero. The RESET signal from RESET CIRCUIT 62 occurs when the voltage on the bus exceeds, e.g., 5 volts. When the bus voltage exceeds 5 volts, the 5 VDC power supply network 60 turns on, then the RESET circuit 62 is cut off after a delay caused by a delay circuit within circuit 62. The output of an UNDERTH circuit 70 is HIGH; while, the output of a CLOCK and OVERTH circuit 72 is LOW since these circuits respond to voltages placed on the bus above the reference voltage T1.

When the leading edge of the (P) half cycle of the waveform goes above level T2 of about 6 VDC, the output of the CLOCK and OVERTH circuit 72 remains LOW, while the output of the UNDERTH circuit 70 changes from HIGH to LOW. During this (P) half cycle of the waveform, the condition of these output signals do not have any affect on the system; however, this condition of these outputs will play a very important role during the negative (N) half cycle of the waveform which will be explained infra.

When the leading edge of the initial half cycle moves up and over level T1, it is considered over the threshold voltage. The output of the CLOCK and OVERTH circuit 72 changes from LOW to HIGH the output of UNDERTH circuit 70 remaining LOW. The HIGH output causes a CLOCK signal to be applied to a CLOCK input of the 5-BIT counter 66 which counts up one binary sequence. And if the address detector circuit 68 is pre-programmed to be enabled by a binary one from counter 66, then an ADDRESS signal from the output of circuit 68 will occur. Also, a 2-bit counter 76 of an ON/OFF control circuit 74 is clocked up one binary sequence if ADDRESS is high.

However, the control element smart control device 14 will not be officially addressed at this time. Address detector 68 for this particular control element must generate three consecutive ADDRESS signals before this control element provides a control signal to the motor or relay driver circuit intended to be controlled. Hence, both the $Q_0$ and $Q_1$ outputs of 2-BIT COUNTER 72 must be HIGH. For this to occur, there must be three polling cycles of waveform 58. See FIG. 3A. The ADDRESS signal from detector 68 and the UNDERTH signal from UNDERTH circuit 70 are applied as low signals during level S of the pulse train to a 2-input AND gate 78 of the ON/OFF control circuit 74. The output of gate 78 is applied to a clock input of 2-BIT counter 76.

Upon the occurrence of three consecutive polling cycles with the UNDERTH signal programmed HIGH (i.e., bus voltage below T2) each time during the (N) half cycle and with the smart control element being addressed each time, the HIGH output signals from $Q_0$ and $Q_1$ of 2-BIT COUNTER 76 are applied to an AND gate 80. The output of gate 80, a CLK-1 signal, is applied to a toggle input of a conventional toggle flip-flop (T-F/F) circuit 82. The T-F/F 82 changes state each time it is toggled by a positive going CLK-1 signal. But, however the program in MCU 20 of the CCD/R 11 determines when and how often T-F/F 82 is toggled.

Assuming T-F/F 82 has been toggled ON, the output of T-F/F 82 is applied to a relay driver circuit 84 and the constant current sink is turned on acknowledging that the control element has turned on as commanded. On the other hand, if T-F/F 82 has been toggled off, the constant current source is not turned on during the negative half cycle, thus acknowledging the off command from MCU 20. Circuit 84, illustratively may be a conventional solid state relay switch. Circuit 84 turns ON a relay; the relay contact closes applying, illustratively, 12 VDC to a wiper motor 15 turning it ON.

If the voltage during the (N) half cycle is not below T2 when the element is being addressed, the 2 bit counter 76 is reset.

Counter 76 is also reset via AND gate 78a at the end of the current address cycle if $Q_0$ and $Q_1$ are both HIGH.

Also the output of T-F/F 82 is applied to an OR gate 88 of $\overline{SINK}$ circuit 86 along with an OVERTH signal from CLOCK and OVERTH circuit 72. The output of OR gate 88 along with the ADDRESS signal from detector 68 is applied to a 2-input NAND gate 90 to develop a $\overline{SINK}$ signal. A $\overline{SINK}$ signal from the output of gate 90 turns on PNP transistor 92 which then turns ON a NPN transistor 96 of constant current source circuit 94 causing a constant current signal to exist on bus 12.

Figure 5:
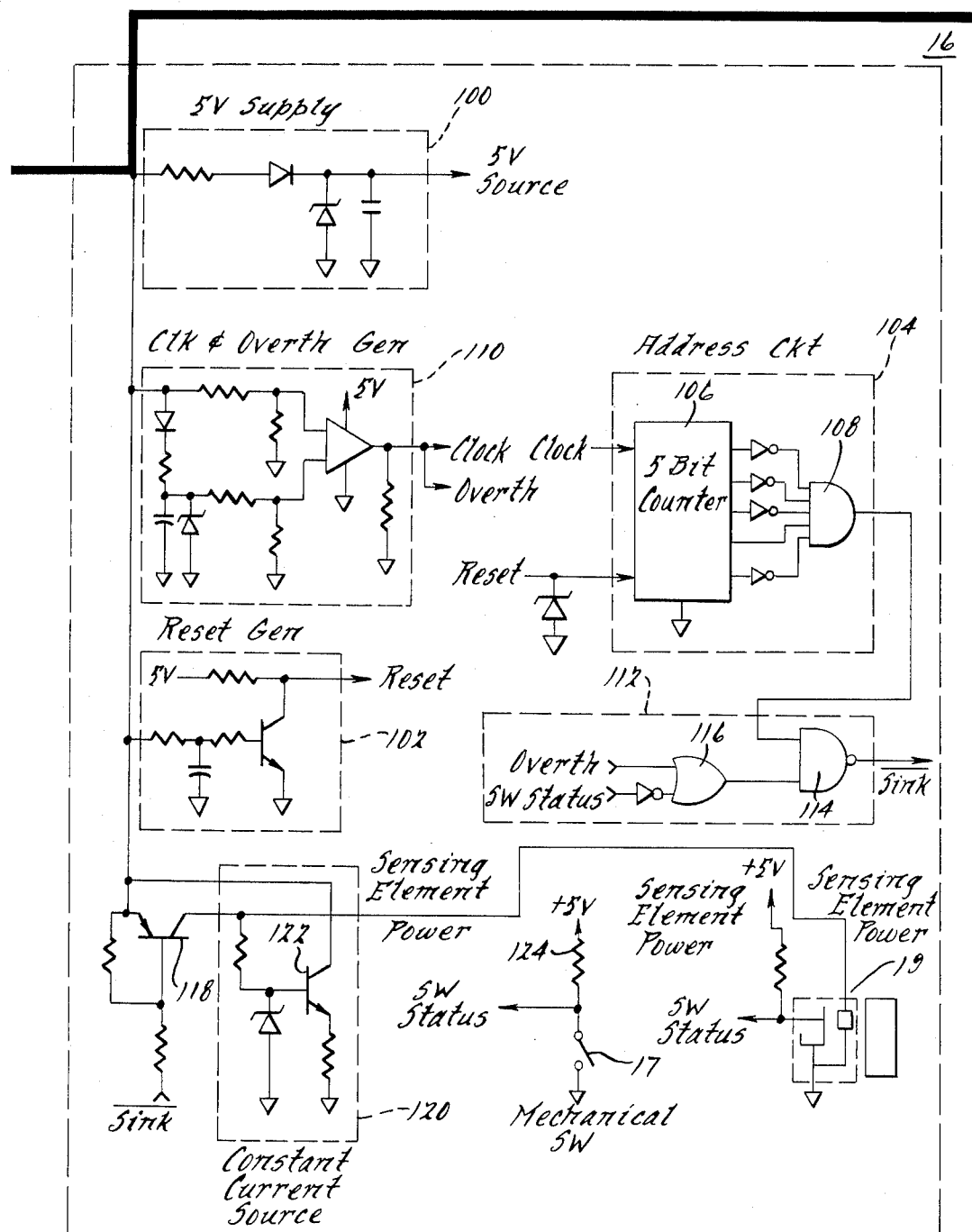
FIG. 5 is a schematic diagram of a smart switch sensor also connected to the single wire bus of FIG. 1, and FIGS. 6–6B are flowcharts depicting the computer program used for controlling the multiplex system.

SMART SWITCH SENSOR (see FIG. 5)

A separate smart switch sensor 16 is interposed between bus 12 and a switch contact of a switch 17 being monitored. As with the smart control element, sensor 16 receives power when the offset voltage waveform 58 of FIG. 2 is applied to bus 12. The transition of the leading edge of the (P) half cycle of the initial waveform cycle from 0-volt to control level C (about 5 VDC) causes power to be applied to the smart sensor. But at this stage, there isn't enough power to generate source voltage from the sensor circuits. The sensor is considered OFF.

When the leading edge of the initial (P) half cycle of the waveform goes above 5 VDC to level "S" of about 6 VDC a 5 VDC source 100 is activated and it provides 5 VDC power to all the circuits of the smart sensor. A reset signal generator 102 provides a reset signal to a 5-bit counter 106 of address unit 104 which resets all of the counter outputs to LOW or to the binary code number representation of the number zero. The RESET signal from reset generator 102 occurs when the voltage on the bus exceeds, e.g., 5 VDC. When the bus voltage exceeds 5 VDC, the 5 VDC supply network 100 turns on, then the reset generator 102 is cut off after a delay caused by a delay circuit within reset generator 102.

When the leading edge of the (P) half cycle of the waveform goes above level T1 or above 8 VDC, the output of a CLOCK and OVERTH circuit 110 goes from LOW to HIGH generating a CLOCK-S signal and an OVERTH (T1) signal. The CLOCK-S signal is applied to a clock input of the 5-bit counter 106 and is used for incrementing the counter 106 during each cycle of the waveform. It should be appreciated that there's no difference between the CLOCK-C signal used in the smart control element circuit and the CLOCK-S signal used in the smart sensor circuit. The 5-bit counters in the smart control elements and in the smart sensors are clocked when the waveform passes through threshold T1.

If the count in counter 106 provides output signals to address detector 108 than the smart sensor will be addressed. When addressed, an ADDRESS signal from the output of detector 108 along with an OVERTH signal applied via an OR gate 116 are applied to an 2-input AND gate 114; a $\overline{SINK}$ signal results at the output of AND gate 114. The $\overline{SINK}$ signal turns on PNP transistor 118 which provides current to a sensing element resistor 124 and also turns ON an NPN transistor 122 of constant current source circuit 120 causing a constant current signal to exist on bus 12.

OPERATION OF THE SYSTEM

The operation of system 10 will now be discussed. Assume the status of switch 17 of FIG. 1 is desired and there's a need to turn on wiper motor 15. Switch 17 may be connected to the suspension of the vehicle. When switch 17 is closed, the suspension is proper; when open, there's a problem with the suspension.

Smart control element 14 and sensor 16 are interposed between bus 12 and relay driver 84 and the sensing element resistor 124 respectively. Because system 10 is connected in parallel with the primary power system of the motor vehicle (not shown), 12 VDC is applied to the 5-VOLT voltage regulator 22 and the D/R circuit 18. The 5 VDC source voltage from V-regulator 22 is applied to MCU 20, but the RESET terminal is held LOW for approximately 20 ms to allow the D/R 18 to become ready for MCU control.

Figure 6:
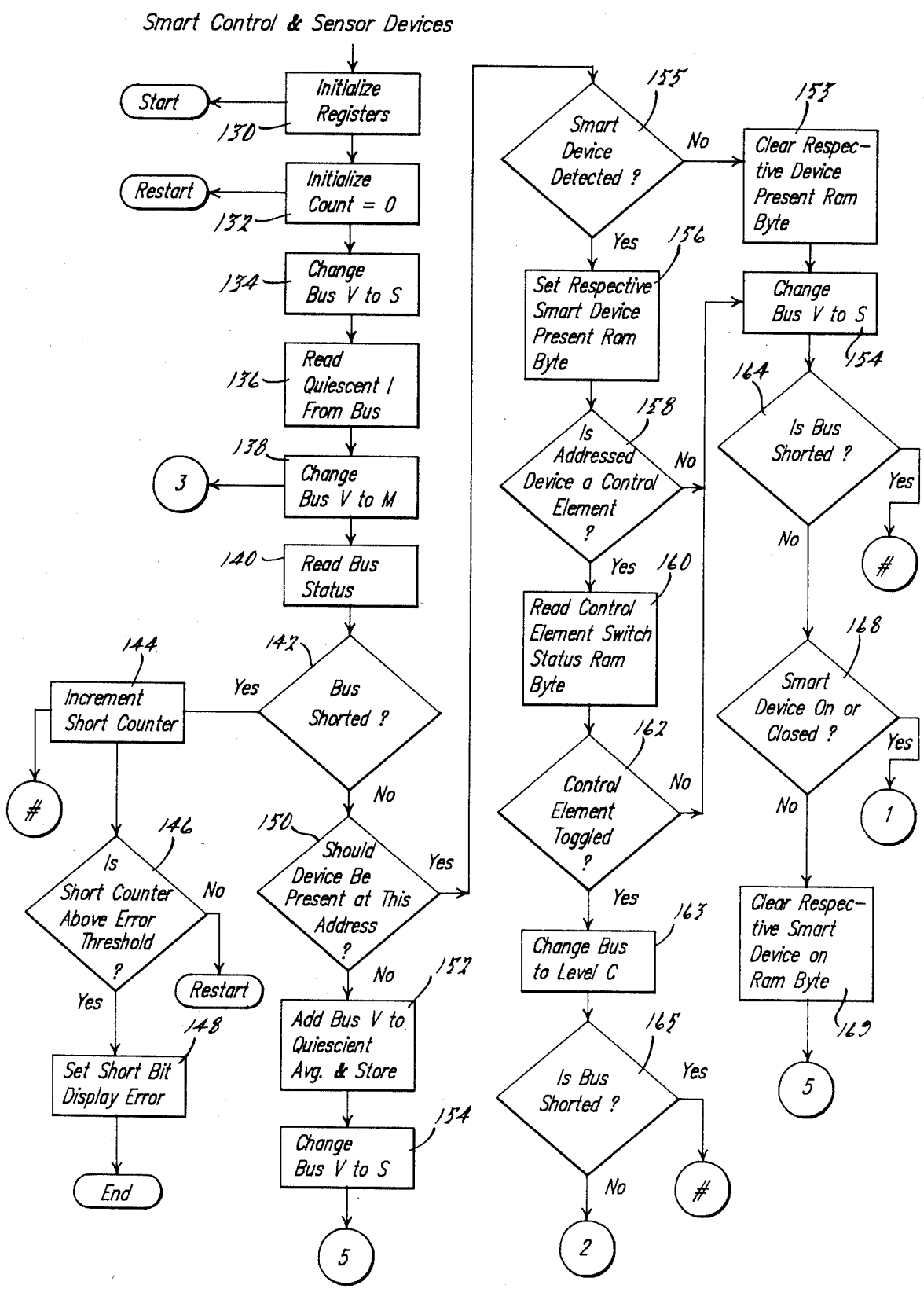

To relate the operation of MCU with D/R 18, reference is now made to FIG. 6, a flowchart of the program executed by MCU 20 to control smart control element 14 is shown. After the 20 ms delay, as in block 130, MCU 20 executes a small start-up program which sets all CPU registers with correct values and clears all information in the computer memory to zero before accepting information from D/R 18. This is called initializing the registers.

Then MCU 20 initializes its internal smart control element and smart sensor counters in RAM as indicated in block 132. As can be appreciated by those skilled in the art, MCU 20 operates in the MHz range while system 10 operates around 1 KHz. Hence, MCU 20 can perform many functions before system 10 reacts.

Hence, as in instruction block 134, where MCU 20 is instructed to change the bus voltage to level "S", the voltage on the bus should be placed at, e.g., 7 volts.

Then, MCU 20 is instructed as in block 136 to read the quiescent current from the bus. MCU 20 reads P20-P27 to see what current signals have been converted to voltage signals by current to voltage converting resistor 52, differential amplifier 54 and A/D converter 55. Various current signals could exist on the bus; e.g. the bus could be shorted directly to ground; smart device(s) could be attempting to control the bus at incorrect times and very high current would occur on the bus; or no smart devices could be present on the bus, this occurs when none of the devices are addressed and a bus quiescent current would be read; or a smart device could be addressed and ON the bus.

To ensure that noise spikes or other forms of interfering signals are filtered, when MCU 20 reads the status of the bus, illustratively, MCU 20 samples each half cycle of the voltage signal from bus 44 ten times. If, e.g. seven out of ten samples are true or desired values, then the reading is considered valid and high currents are presently on the bus. If three of the ten samples are true, then the three samples are considered invalid or are false signals caused by interfering signals. If between three and seven samples are true, then MCU 20 disregards its findings and then looks at a different set of sampled current data.

MCU 20 then, as in decision block 138, changes the bus voltage to level "M" or 9 volts and then again, as in decision block 140, reads the status of the bus.

In block 142, MCU 20 determines whether bus 12 shorted. If it is, then, as in block 144, MCU 20 is instructed to increment its internal "short" counter. Then MCU 20 determines as in decision block 146 whether its short counter is above an error threshold. If it is, then MCU 20 is instructed as in block 148 to set an internal short bit display error counter in RAM memory. Data stored in this section of RAM will be displayed on display system 56 at a later time. If the bus is not shorted, then the program moves to RESTART the program at block 132.

If the bus is not shorted at level "M", MCU 20 determines whether a smart device is supposed to be present on the bus at this address as in decision block 150. If MCU 20 determines that no smart devices are present, then MCU 20 is instructed in block 152 to add the bus voltage to the quiescent average and store it. Then, as in, instruction block 154, MCU 20 changes the bus voltage to level "S" and then go to "5" in the program. If MCU 20 determines that a smart device should be present, and is present as in block 155, then it sets the element of sensor present bit in the appropriate RAM byte location as in block 156.

If MCU 20 determines that a smart device should be present, but it is not, then as in block 153, then MCU 20 clears the respective device present RAM BYTES and then changes the bus voltage to level "S."

Then, MCU 20 makes a decision as in block 158 whether the addressed smart element is a control element. If its not a control element, MCU 20 is instructed to change the bus voltage to level "S" as in block 157 in order to determine the status of a smart sensor. If it is a control element, MCU 20 reads the smart control element's switch status (block 160). Then the program moves to decision block 162.

MCU 20 checks to determine whether to toggle ON/OFF control unit 74 (block 162). If not, then the program causes MCU 20 to change the bus voltage to level "S" (block 154) so that the status of the control element's toggle flip-flop 82 can be determined. MCU 20 doesn't want to change the existing status of that flip-flop.

As in decision block 164, MCU 20 checks to determine whether bus 12 is shorted. If bus 12 is shorted, the program loops back to instruction block 144.

If the bus is not shorted, MCU 20 determines whether a smart control element is ON or whether a smart sensor is monitoring a CLOSED switch (decision block 168). If a smart device is not ON or switch is not CLOSED, MCU, as in block 169, clears the respective ELEMENT ON or SENSOR SW CLOSED bit in the appropriate RAM byte location. If a smart device is ON or switch is CLOSED, the program moves to instruction block 170. Here, MCU 20 sets the appropriate control element, ON bit RAM byte location or sensor SW, CLOSED bit RAM byte location and then it increments the appropriate internal control element or sensor counter (block 172) so that the next smart element may be addressed.

Then MCU 20 determines whether all smart devices had been checked (decision block 174). If so, then MCU 20 updates the switch status and control element display ON display system 56 (block 176). If not MCU 20 loops back to instruction block 138 wherein the bus voltage is changed to level "M" and the sequence starts over again for the next addressed smart device.

Returning to decision block 162, if ON/OFF control unit 74 needs to be toggled then MCU 20 is instructed by block 163 to change the bus voltage to level "C." Then, the bus is checked for shorts as in block 165. If the bus is shorted, the program loops back to block 144. If it is not shorted, MCU 20 is instructed, as in block 178, to decrement its internal toggle counter and then move to decision block 180. MCU 20 determines whether its toggle counter has counted down to zero. If not, then MCU 20 is instructed to loop around to instruction block 172 in order to address the next smart element on bus 12.

If the internal toggle counter of MCU 20 is at zero, then MCU 20 makes a determination as to whether the control element present status is correct as in decision block 182 by reading the current on the bus. If there is correspondence between what MCU 20 expects and what current signal MCU 20 received when bus 12 was read, then within MCU 20 as in block 184 the internal toggle control flip-flop is toggled so as to correspond with the T-flip-flop in the addressed control element unit 14. Then as in block 186, MCU 20 sets the toggle control element counter to equal the value three so that another series of three polling cycles may be performed, then the program hops back to block 154 so that the bus can be checked again.

If the control element present status is not correct, then MCU 20 is instructed as in block 188 to increment its incorrect behavior counter for that control element.

Then as in decision block 190, MCU 20 determines whether the incorrect behavior counter value is above an error threshold. If it is, then the error is flagged as in block 192, and MCU 20 hops back to block 172.

If the incorrect behavior counter value is not above an error threshold, then MCU 20 loops back to block 186 to set the toggle control element counter equal to three and then the bus is again checked for shorts.

While the present invention has been disclosed in connection with the preferred embodiment thereof, it should be understood that there may be other embodiments which fall within the spirit and scope of the invention and that the invention is susceptible to modification, variation and change without departing from the proper scope or fair meaning of the following claims.

We claim:

1. A multiplex system within a motor vehicle for both controlling a plurality of individual relay drivers and for monitoring the status of a plurality of individual alternate-action switches disposed throughout a motor vehicle.

(a) a bi-directional, single wire bus for transmitting voltage signals in a first direction and current signals, in a second direction in given formats, said bus being routed throughout the vehicle near each of said plurality of relay drivers and said plurality of switches, said voltage and said current signals being derived in said multiplexed system;

(b) a plurality of smart switch sensors, each of said sensors being disposed near each of said plurality of switches, each of said means for forming a first connection with each of said plurality of switches and another means for forming a second connection across said bus and a chassis ground of said vehicle, each of said switch sensor means having circuits for providing current signals which are placed on said bus, each of said sensors placing a current signal on said bus during a predetermined time slot of a polling cycle of said switches, said current signals being indicated of a status of a contact of said switch and of said sensors associated with the predetermined time slot;

(c) a plurality of smart control elements, each of said control elements being disposed near relay drives, each of said control elements having means for forming connections with first and second terminals of said relay drivers and another means for forming a connection across said bus and the chassis ground of said vehicle, each of said control elements having circuits for providing current signals which are placed on said bus, each of said control elements placing a current signal on said bus during a predetermined time slot of a given polling cycle of said switch sensors and said control element, said current signals being indicative of a status of said relay drivers of said control elements associated with the predetermined time slots, each of said control elements also having means for providing ON and OFF control signals to each of said relay drivers upon completion of a predetermined number of successive sequences of the polling cycle of each of said control elements;

(d) a driver and receiver means connected to a power source of a vehicle and a terminating end of said single-wire bus for generating power and voltage signals in the form of an offset square-wave pulse train of a chosen format, said pulse train being driven onto said bus by said driver and receiver means, said switch sensors and said control elements being connected to said bus 50 as to receive said pulse train and to use various voltage levels of said pulse train to derive power for operation of circuits within said switch sensors and within said control elements, said pulse train also providing voltage signals indicative of a polling of each switch sensor and each control element so that each of said plurality of sensors and each of said plurality of control elements are addressed in sequence and then allotted individual predetermined time on said bus, the addressing of each sensor and each control element and the allotment of time on said bus being performed in a chosen sequential manner, the sequential manner forming the polling cycle of said sensors, and said control elements, the polling of each of said sensors and each of said control elements being at a chosen polling cycle rate; said driver and receiver means also having means for receiving and then converting said current signals sent over said bus by an addressed sensor or an addressed control element into voltage signals indicative of the status of each of said addressed sensor and said associated switch and of the status of each of said addressed control element and said associated relay driver;

(e) display means for displaying the status of each of said plurality of switch sensors and said associated switches, as well as each of said plurality of control elements and said associated relay drivers;

(f) a microcomputer means interconnecting said driver and receiver means and said display means for (1) writing voltage and clock signals to said driver and receiver circuits which controls the generation of the offset square wave pulse train including the various voltage levels placed on the bus, for (2) reading voltage signals from said driver and receiver circuit indicative of current signals on the bus caused by each of said addressed sensor and its associated switch or of said addressed control element and its associated relay driver, for (3) establishing a history of performance of each of said addressed sensors, said associated switches, said addressed control elements and said associated relay drivers and of said bus during each polling cycle of said sensors and said control elements and for (4) transferring updated independent sensor, switch, control element and relay driver data indicative of the status of said sensors, said switches, said control elements and said relay drivers to said display means during each polling cycle.

2. Apparatus in accordance with claim 1 wherein said offset square wave pulse train has at least six voltage levels including an off or zero volt level, a control lever "C" at a chosen voltage level above zero volt, an under-threshold level $T_2$ at a chosen voltage level above level "C", a status level "S" at a chosen voltage level above level "$T_2$", and overthreshold level "$T_1$" at a chosen voltage level above level "S" and a maximum voltage level "M" at a chosen voltage level above level "$T_1$."

3. Apparatus in accordance with claim 2 wherein after an initial cycle of said pulse train, the voltage starts at zero and rises to the next voltage level during a positive half cycle, wherein each succeeding pulse excludes said off level voltage with said last cycle being an exception, said last cycle having an off voltage level at the trailing end of a negative half cycle.

4. Apparatus in accordance with claim 3 wherein each of said plurality of switch sensors and each of said plurality of control elements has a voltage supply means receptive to said under threshold level "$T_2$" of said pulse train which provides power to circuits on each of said plurality of switch sensors and said plurality of control elements.

5. Apparatus in accordance with claim 4 wherein each of said plurality of switch sensors has a clock and overthreshold generator, a reset generator, a constant current source and an address circuit.

6. Apparatus in accordance with claim 4 wherein each of said plurality of control elements has an underthreshold generator, a clock and overthreshold generator, a reset generator, a constant current source and an address circuit.

7. Apparatus in accordance with claims 5 and 6 wherein each of said reset generator is responsive to voltage from said bus as well as to voltage from said voltage supply means, said reset generator supplying a reset signal to a 5-bit counter in said address circuit when the bus voltage exceeds 5 volts, the resetting of the 5-bit counter occurring during a voltage start-up of each of said plurality of switch sensors and each of said plurality of control elements during said underthreshold voltage level "$T_2$" of said pulse train at the beginning of a new polling cycle.

8. Apparatus in accordance with claim 7 wherein said clock and overthreshold generator provides a clock signal to said 5-bit counter and said 5-bit counter of said address circuit when the voltage on said bus goes to about the overthreshold voltage level "$T_1$"; said clock signals clocking said counter up one binary sequence, said 5-bit counter in each of said plurality of switch sensors and each of said plurality of control elements being simultaneously clocked, wherein an address detector is associated with said 5-bit counter, wherein each of said plurality of switch sensors and said plurality of control elements includes an address detector preprogrammed to receive a unique binary count and wherein the preprogramming causes each of said address detectors to be sequentially enabled and to provide an address signals, said address signal being used to designate a chosen switch sensor or a chosen control element from said plurality of switch sensors and control elements as being addressed.

9. Apparatus in accordance with claim 8 wherein said address signal is used along with one overthreshold signal or as switch status signal to generate a $\overline{\text{SINK}}$ signal within said addressed switch sensor, and wherein said $\overline{\text{SINK}}$ signal is used to enable said constant current generator in said addressed sensor so as to place current signals on said bus during a clocked pulse.

10. Apparatus in accordance with claim 8 wherein said address signal is used along with an overthreshold signal or an ON signal to generate a $\overline{\text{SINK}}$ signal within said addressed control element, and wherein said $\overline{\text{SINK}}$ signal is used to enable said constant current generator in said addressed control element so as to place current signals on said bus during a clocked cycle.

11. Apparatus in accordance with claim 10 wherein each of said control elements provides an ON signal after three consecutive polling cycles with an underthreshold signal from said underthreshold generator programmed HIGH each time during the negative half cycle when each of said control elements is addressed during each of the three consecutive polling cycles wherein said control elements provide a current sink signal to the microcomputer providing immediate acknowledgement of the command issued by said microcomputer after the third polling cycle and wherein the constant current source is not turned on during the negative half cycle to acknowledge the off command issued by said microcomputer after the third polling cycle.

12. Apparatus in accordance with claims 9 or 10 wherein said driver and receiver means includes an analog to digital converter means for providing voltage signals to said microcomputer indicative of the status of each of said addressed sensors and of each of said addressed control elements, as well as of said bus during each cycle within each polling cycle of said sensors and said control elements.

13. Apparatus in accordance with claim 12 wherein integration means within said microcomputer is provided to ensure that the status voltage readings are substantially free of interfering signals.

* * * * *

UNITED STATES PATENT AND TRADEMARK OFFICE
CERTIFICATE OF CORRECTION

PATENT NO. : 4,736,367            Page 1 of 2

DATED : April 5, 1988

INVENTOR(S) : Wroblewski et al.

It is certified that error appears in the above-identified patent and that said Letters Patent is hereby corrected as shown below:

```
Column 1, line 55, following "again" insert --,--;

Column 2, line 1, change "of" to read --or--;
          line 39, change "device" to read --devices--;

Column 3, line 8, after "MCU 20" insert --,--;

Column 5, line 4, after "HIGH" insert --,--;
          line 40, after "however" insert --,--;
          line 49, after "illustratively" insert --,--;
          line 59, after "Also" insert --,--;

line 43, correct "detector 108 than" to read
              --detector 108, then--;

Column 7, line 27, after "e.g." insert --,--;
          line 30, after "bus" insert --.--;
          line 31, change "this" to read --This--;
          line 35, correct "filtered," to read --filtered--;
          line 66, correct "in," to read --in--;
          line 67, correct "go" to read --goes--;
```

UNITED STATES PATENT AND TRADEMARK OFFICE
CERTIFICATE OF CORRECTION

PATENT NO. : 4,736,367

DATED : April 5, 1988

INVENTOR(S) : Wroblewski et al.

It is certified that error appears in the above-identified patent and that said Letters Patent is hereby corrected as shown below:

Column 8, line 5, correct "then MCU 20" to read --MCU 20--;
         line 10, correct "its" to read --it is--;
         line 35, correct "element, ON" to read
                --element ON--;
                correct "SW," to read --SW--;
         line 48, after "toggled" insert --,--;
         line 68 after "Then" insert --,--;

In The Claims:

Column 9, line 28, correct "vehicle." to read --vehicle, said system comprising:--;

Column 12, line 2, correct "signals" to read --signal--;

line 27, correct "sink" to read --$\overline{SINK}$--.

Signed and Sealed this

Sixteenth Day of May, 1989

Attest:

DONALD J. QUIGG

Attesting Officer      Commissioner of Patents and Trademarks